US012736827B2

(12) United States Patent
Grasser et al.

(10) Patent No.: US 12,736,827 B2
(45) Date of Patent: Sep. 15, 2026

(54) OBSERVATION SYSTEM AND METHOD

(71) Applicant: BERTIN TECHNOLOGIES, Montigny le Bretonneux (FR)

(72) Inventors: Régis Grasser, Aix en Provence (FR); Emmanuel Soulié, Rousset (FR)

(73) Assignee: BERTIN TECHNOLOGIES, Montigny le Bretonneux (FR)

( * ) Notice: Subject to any disclaimer, the term of this patent is extended or adjusted under 35 U.S.C. 154(b) by 353 days.

(21) Appl. No.: 18/260,747

(22) PCT Filed: Feb. 9, 2022

(86) PCT No.: PCT/EP2022/053133

§ 371 (c)(1), (2) Date: Jul. 7, 2023

(87) PCT Pub. No.: WO2022/171674

PCT Pub. Date: Aug. 18, 2022

(65) Prior Publication Data

US 2024/0248320 A1 Jul. 25, 2024

(30) Foreign Application Priority Data

Feb. 10, 2021 (FR) .................................... 2101278

(51) Int. Cl.
*G02B 27/14* (2006.01)
*G02B 23/12* (2006.01)

(52) U.S. Cl.
CPC ............ *G02B 27/144* (2013.01); *G02B 23/12* (2013.01)

(58) Field of Classification Search
CPC ............................ G02B 27/144; G02B 23/12
(Continued)

(56) References Cited

U.S. PATENT DOCUMENTS 8,860,831 B1 * 10/2014 Burton .................. H04N 23/45 348/222.1
9,851,177 B2 12/2017 Couture
(Continued)

FOREIGN PATENT DOCUMENTS

EP 2416201 A2 2/2012
EP 2416201 A3 4/2012
(Continued)

OTHER PUBLICATIONS

International Search Report issued in corresponding International Application No. PCT/EP2022/053133, dated Apr. 8, 2022, pp. 1-2, Rijswijk, Netherlands.

(Continued)

*Primary Examiner* — Sharrief I Broome
(74) *Attorney, Agent, or Firm* — HAUPTMAN HAM, LLP

(57) ABSTRACT

Observation system including a first optical path that is capable of receiving first optical radiation emitted by a scene and including a sensor for generating a first digital image from the first optical radiation; a second optical path that is capable of receiving second optical radiation originating from the scene and including an optical attenuator having a variable opacity; a display for displaying a second digital image from the first digital image; a third optical path coupled to the display and to the optical attenuator for observing the second digital image and third optical radiation transmitted by the optical attenuator; and an electronic control unit including an image processing unit for determining a light intensity of at least one pixel of the first digital image, the electronic control unit being configured to output a command to vary the opacity of the optical attenuator based on the determined light intensity.

11 Claims, 1 Drawing Sheet

(58) Field of Classification Search
USPC .......................................................... 359/629
See application file for complete search history.

(56) References Cited

U.S. PATENT DOCUMENTS

| | | | | |
|---|---|---|---|---|
| 2009/0303315 | A1* | 12/2009 | Charlesworth .......... | G02B 7/12 359/473 |
| 2012/0033195 | A1* | 2/2012 | Tai .......................... | F41G 3/165 359/633 |
| 2015/0377587 | A1* | 12/2015 | Couture ............. | G02B 27/0189 348/162 |
| 2019/0336334 | A1* | 11/2019 | Tripathi ............... | A61B 3/1015 |

FOREIGN PATENT DOCUMENTS

| | | | | |
|---|---|---|---|---|
| FR | 3048800 | A1 | 9/2017 | |
| WO | WO-2007044582 | A1 * | 4/2007 | ........... H04N 23/741 |
| WO | 2019097522 | A1 | 5/2019 | |

OTHER PUBLICATIONS

Written Opinion issued in corresponding International Application No. PCT/EP2022/053133, dated Apr. 8, 2022, pp. 1-6, Rijswijk, Netherlands.

* cited by examiner

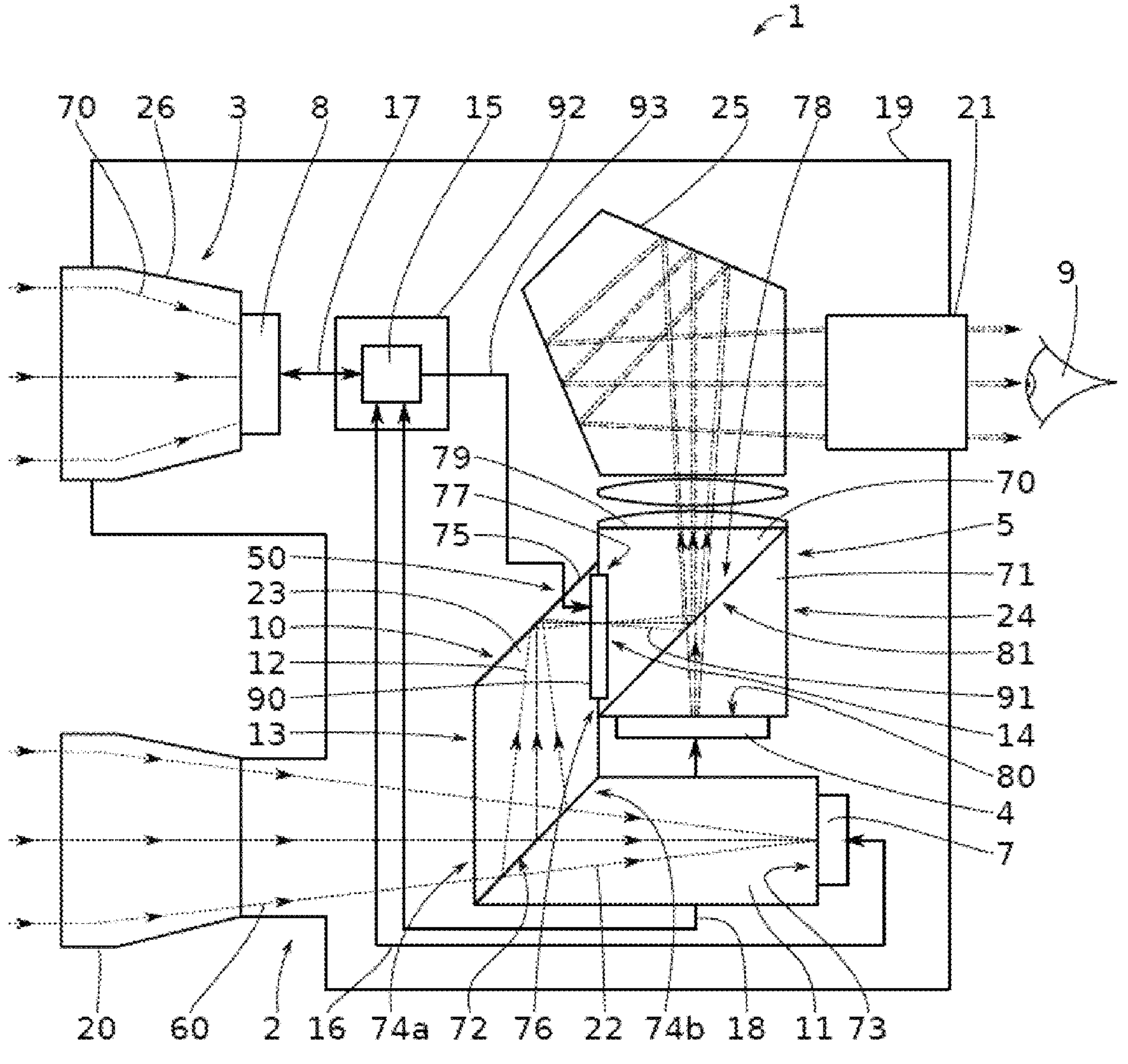
1
70
26
3
8
17
15
92
93
25
78
19
21
9
79
77
75
70
5
50
23
10
12
90
13
71
24
81
91
14
80
4
7
20
60
2
16
74a
72
76
22
74b
18
11
73

OBSERVATION SYSTEM AND METHOD

The present application is a U.S. National Phase of International Application Number PCT/EP2022/053133, filed Feb. 9, 2022, which claims priority to French Application No. 2101278, filed Feb. 10, 2021.

TECHNICAL FIELD OF THE INVENTION

The invention relates to the observation of a scene, and more particularly observation using a portable system.

PRIOR ART

Monocular systems, or binoculars, are currently used to observe scenes. These systems can be purely optical, i.e. they comprise direct observation paths, for example binoculars fitted with lenses for the magnified observation of a distant scene. Other systems, for example digital cameras, comprise both a direct observation path and a digital observation path, i.e. one that uses a digital sensor to generate a digital image of the scene being observed. However, these systems do not allow for effective observation of a scene at night.

Some systems allow a scene to be viewed at night, such as that of the patent document US 2015/0377587, which discloses a night vision system comprising an infrared-type video camera, an eyepiece for observing the video image and an optical device fitted with a beam splitter for reflecting part of the video image towards the eyepiece and for transmitting an optical image originating from a scene to be observed. The device includes an optical attenuator that can be switched between a transparent mode for using the system for day vision and an opaque mode for using the system for night vision by preventing light from exiting the optical device in order to operate discreetly at night. However, this system is not adapted for optimising the image observed by a user for system use both during the day and at night.

SUMMARY OF THE INVENTION

One aim of the invention is to overcome these drawbacks, and more particularly to provide means to improve the observation of a scene both in the day and at night.

Another aim is to provide observation means that minimise power consumption.

According to one aspect, the invention proposes an observation system comprising a first optical path that is capable of receiving first optical radiation emitted by a scene to be observed and including a main sensor configured to generate a first digital image from the first optical radiation; a second optical path that is capable of receiving second optical radiation originating from the scene to be observed and including an optical attenuator having a variable opacity and capable of modifying a light intensity of the second optical radiation; a display configured to display a second digital image from the first digital image; and a third optical path coupled to the display and to the optical attenuator and designed to observe the second digital image and third optical radiation transmitted by the optical attenuator.

The system includes an electronic control unit including an image processing unit configured to determine a light intensity of at least one pixel of the first digital image, and the electronic control unit is configured to output a command to vary the opacity of the optical attenuator based on the determined light intensity.

Thus, a system is provided that improves the observation of a scene. In particular, an automated system is provided that takes into account the light intensity of the optical radiation emitted by the scene to improve observation. Such a system is particularly suitable for simultaneously observing a scene using two optical paths. It further optimises the observation of the scene in intermediate conditions between day and night vision, where the scene information is shared between the two optical paths.

According to one embodiment, the optical attenuator includes at least one liquid crystal cell.

According to another embodiment, the optical attenuator includes at least one electrochromic cell.

According to one embodiment, the optical attenuator is configured to transmit the third optical radiation by transparency.

According to another embodiment, the optical attenuator is configured to transmit the third optical radiation by reflection.

The electronic control unit can be configured to output a command to increase the opacity of the optical attenuator when the light intensity of said at least one pixel is greater than or equal to a threshold.

The system can comprise a fourth optical path capable of receiving fourth optical radiation emitted by the scene and including an additional sensor configured to generate a third digital image from the fourth optical radiation; the image processing unit being configured to generate the second digital image from a fusion between the first and third digital images.

The first optical path can comprise an optical element configured to transmit a first part of the first optical radiation to the first sensor and to transmit a second part of the first optical radiation corresponding to the second optical radiation to the optical attenuator.

The system can further comprise an optical assembly including the optical element and the optical attenuator, the optical assembly being in one piece.

According to another aspect, the invention proposes an observation method, comprising receiving first optical radiation emitted by a scene to be observed from a first optical path provided with a main sensor generating a first digital image from the first optical radiation; receiving second optical radiation originating from the scene to be observed from a second optical path provided with an optical attenuator having a variable opacity and capable of modifying a light intensity of the second optical radiation; displaying a second digital image from the first digital image; and observing, from a third optical path, third optical radiation transmitted by the optical attenuator, and the second digital image.

The method includes determining a light intensity of at least one pixel of the first digital image and varying the opacity of the optical attenuator based on the determined light intensity.

BRIEF DESCRIPTION OF THE FIGURE

Other features and advantages will be better understood after reading the following description of specific embodiments and implementations of the invention, which are given as non-limiting examples only, with reference to the accompanying FIGURE, in which:

FIG. 1 diagrammatically shows an embodiment of an observation system according to the invention.

The drawing is provided by way of example and is not intended to limit the scope of the invention. It constitutes a diagrammatic view intended to ease the understanding of the invention and is not necessarily to the scale of practical applications.

DETAILED DESCRIPTION

FIG. 1 shows an observation system 1 for observing a scene. Generally speaking, the system 1 comprises a first optical path 2, a second optical path 10, a display 4 and a third optical path 5 coupled to the display 4. Advantageously, the observation system 1 is portable, i.e. it can be carried by hand by a user. Moreover, the first optical path 2 is capable of receiving first optical radiation 60 emitted by the scene to be observed, the latter not being represented in the FIGURES for simplification purposes. Optical radiation is understood to mean electromagnetic radiation in the ultraviolet, visible and infrared ranges. The scene to be observed can be located outside, as well as inside a building, and the system 1 is particularly suitable for observing the scene both during the day and at night. The first optical path 2 includes a first sensor 7, referred to as the main sensor, configured to generate a first digital image from the first optical radiation 60. The first sensor 7 is an electronic device and is powered by a battery, not shown in the FIGURES for simplification purposes. The display 4 is configured to display at least the first digital image originating from the first sensor 7. In particular, the display 4 is configured to display a second digital image from the first digital image. The display 4 is powered by the battery. For example, the first optical path 2 can be a daytime digital observation path, i.e. the first sensor 7 is sensitive to light visible to an eye of the user 9. According to another embodiment, the first optical path 2 is a night-time digital observation path, i.e. the first sensor 7 is sensitive to infrared light, for example to light with a wavelength greater than or equal to 700 nm.

The second optical path 10 is capable of receiving second optical radiation 12 originating from the scene to be observed and includes an optical attenuator 90 having a variable opacity. That is to say that the optical attenuator 90 is capable of changing a light intensity of the second optical radiation 12. The second optical radiation 12 can be emitted by the scene, in which case the second optical path 10 receives the second optical radiation 12 directly. Alternatively, as shown in FIG. 1, the second optical path 10 connects the first and third optical paths 2, 5. According to this alternative embodiment, the second optical radiation 12 corresponds to a part of the first optical radiation 60. In such a case, the second optical path 10 receives the first optical radiation 60 indirectly.

Moreover, the third optical path 5 is coupled to the optical attenuator 90 and is designed to observe the second digital image displayed by the display 4 and third optical radiation 91 transmitted by the optical attenuator 90.

The system 1 further includes an electronic control unit 92, for example a microprocessor, comprising an image processing unit 15 configured to determine a light intensity of at least one pixel of the first digital image. The image processing unit 15 is a specific microprocessor integrated into the electronic control unit 92 and capable of performing calculations on the digital image originating from the main sensor 7. For example, the image processing unit 15 is capable of carrying out the image processing algorithm steps. The electronic control unit 92 is coupled to the attenuator 4 via a connection 93. The electronic control unit 92 is further configured to output a command to vary the opacity of the optical attenuator 90. For example, the optical attenuator 90 includes one or more liquid crystal cells. Alternatively, the optical attenuator 90 includes one or more electrochromic cells. The optical attenuator 90 receives an electric current, via the connection 93, output by the electronic control unit 92. The opacity of the attenuator 90 varies according to the value of the electric current received. More particularly, the electronic control unit 92 changes the opacity of the attenuator 90 based on the light intensity determined by the image processing unit 15.

Advantageously, the system 1 includes a fourth optical path 3. The fourth optical path 3 is capable of receiving fourth optical radiation 70 emitted by the scene to be observed and includes a second sensor 8 configured to generate a third digital image from the fourth optical radiation 70. The second sensor 8 is separate from the first sensor 7, and is also referred to as an additional sensor. The first and fourth optical paths 2, 3 are also considered to be digital observation paths as they each include a digital sensor 7, 8 configured to generate a digital image. The first and fourth optical paths 2, 3 are also referred to as the first and second digital paths. The second sensor 8 is also powered by the battery.

The image processing unit 15 is further configured to generate the second digital image from the first and third digital images respectively originating from the first and second sensors 7, 8. For example, the second image is generated based on a digital fusion of the first and third digital images. The image processing unit 15 is coupled to the first sensor 7 via a connection 16, and to the second sensor 8 via a connection 17. Moreover, the image processing unit 15 is coupled to the display 4 via a connection 18 in order to transmit the second digital image to the display 4. The display 4 is further configured to display the second digital image from the first and third digital images respectively originating from the first and second sensors 7, 8.

Preferably, the first sensor 7 is sensitive to light visible to an eye of the user 9, for day vision, and the second sensor 8 is sensitive to infrared light, for night vision. Advantageously, the electronic control unit 92 is configured to output a command to increase the opacity of the attenuator 90 when the light intensity of at least one pixel of the first digital image is greater than or equal to a first threshold. Glare, for example from the sun, can thus be avoided in day vision. The image processing unit 15 is further configured to determine a light intensity of at least one pixel of the third digital image. Furthermore, the electronic control unit 92 is configured to output a command to increase the opacity of the attenuator 90 when the light intensity of at least one pixel of the third digital image is greater than or equal to a second threshold. Local glare, for example from a light fixture in an urban zone, can thus be avoided in night vision.

The image processing unit 15 is further configured to determine the light intensities of each of the pixels of the first and third digital images respectively originating from the first and second sensors 7, 8. Moreover, the electronic control unit 92 outputs a command to decrease the opacity of the attenuator when the light intensities of the pixels of the first and third digital images are below the first and second thresholds. When the battery no longer powers the observation system 1, the attenuator 90 has a default opacity value that corresponds to maximum transmission or reflection. For example, the opacity of the attenuator 90 can be zero in the absence of power. This allows observation through the second optical path 10 to be guaranteed in the absence of a power source.

Furthermore, the electronic control unit 92 can be configured to output a command to vary the opacity of the attenuator 90 according to a continuous function following a piecewise continuous, linear or analogue control law, for example a logarithmic function. According to an alternative embodiment, the electronic control unit 92 can be configured to output a command to vary the opacity of the attenuator 90 according to a discrete function following a numerical control law, i.e. with a plurality of stages or levels of opacity, preferably with at least three stages, for example with 128, 256 or 512 stages. Generally speaking, the electronic control unit 92 transmits a command, for example in the form of a voltage in volts, to the attenuator 90. The volt command thus transmitted can follow a continuous or discrete function as defined hereinabove.

Advantageously, the first optical path 2 further includes an optical element 11 configured to transmit the part 12 of the first optical radiation 60 to the second optical path 10. For example, the optical element 11 transmits the part 12 of the first optical radiation 60 to the second optical path 10, whereas another part 22 of the first optical radiation 60 is directed towards the first sensor 7. An optical element 11 is understood to mean an element that allows the trajectory of optical radiation or the properties of the optical radiation to be changed, such as a mirror, a lens, a diffraction grating, or a prism, etc. Preferably, the optical element 11 is a beam splitter, for example a semi-reflective mirror, i.e. an optical element that allows part of the light to be transmitted and the rest to be reflected. In other words, when the optical element 11 is a beam splitter, it allows the part 12 of the first optical radiation 60 to be transmitted to the second optical path 10, and the other part 22 of the first optical radiation 60 to be transmitted to the first sensor 7. The optical element 11 can be a prism having a semi-reflective entrance face 72. A prism is understood to mean a block of cut glass comprising at least five surfaces, or faces. The second optical path 10 allows the user to observe the scene directly. It is also referred to as the direct optical path. In other words, the second optical path 10 does not include an electronic device configured to transform photons into electrons, such as an amplification device, nor an electronic sensor transforming light radiation into a digital image.

Advantageously, the system 1 includes an optical assembly 13 comprising at least the optical element 11. Advantageously, the optical assembly 13 can further comprise other optical elements. These other optical elements are referred to as optical systems 23, 24. The optical element 11 and the optical systems 23, 24 can be prisms and the optical assembly 13 is thus a prismatic assembly, i.e. an assembly of prisms. The optical assembly 13 is a particularly simple and rigid structure and simplifies the observation system 1 while reducing the weight thereof.

FIG. 1 shows an embodiment of the optical assembly 13. The optical assembly 13 includes the optical element 11, a first optical system 23 coupled to the optical element 11, and a second optical system 24 coupled to the first optical system 23. Generally speaking, two elements coupled to one another is understood to mean that two elements are in contact with one another. They can be mounted such that they are fixed to one another, or such that they are removable. In this embodiment, the optical element 11 and the first optical system 23 are respectively two prisms and the second optical system 24 includes two prisms 70, 71.

The optical element 11 includes the entrance face 72 and an exit face 73. The exit face 73 is a neutral face coupled to the first sensor 7. A neutral face is understood to mean a transparent face that allows optical radiation to pass therethrough. The entrance face 72 is a semi-reflective mirror for transmitting a first part 12 of the first radiation 60 to the second optical path 10 and a second part 22 of the first radiation 60 to the first sensor 7, via the exit face 73. In this embodiment, the first part 12 of the first optical radiation 60 is transmitted, by reflection, to the second optical path 10. The first optical system 23 is configured to transmit the first part 12 of the first optical radiation 60 from the second optical path 10 to the third optical path 5. The first optical system 23 includes a first neutral entrance face **74*a* for receiving the first radiation 60, and a second neutral entrance face 74*b* coupled to the entrance face 72 of the optical element 11 for receiving the first part 12 of the radiation. Furthermore, the first optical system 23 includes a neutral exit face 76 and an intermediate face 75 reflecting the first part 12 of radiation to transmit it to the third optical path 5, via the exit face 76. The second optical system 24 acts to optically fuse the second digital image with the third optical radiation 91 transmitted by the attenuator 90. In other words, the second optical system 24 is configured to transmit the third optical radiation 91 to the eyepiece 21 and to transmit the second digital image originating from the display 4 to the eyepiece 21. The attenuator 90 can be fixedly mounted on the exit face 76 of the first optical system 23, and transmit the third optical radiation 91 by transparency. Alternatively, the attenuator 90 can be fixedly mounted on the intermediate face 75 of the first optical system 23, and transmit the third optical radiation 91** by reflection.

The second optical system 24 is a beam splitter. It includes a first prism 70 having a neutral entrance face 77 coupled to the exit face 76 of the first optical system 23, and a semi-reflective intermediate face 78 for transmitting part of the third optical radiation 91 to a neutral exit face 79 corresponding to an exit face of the optical assembly 13. This exit face 79 transmits the optical radiation originating from the scene to be observed and from the second digital image to the eyepiece 21, so that the scene and the second digital image can be observed.

Moreover, the second optical system 24 includes a second prism 71 having a neutral entrance face 80 coupled to the display 4 and a neutral exit face 81 coupled to the intermediate face 78 of the first prism 70. Thus, the second prism 71 allows the second digital image to be transmitted to the exit face 79 of the optical assembly 13. The third optical path 5 comprises the second optical system 24 and allows the scene to be observed based on the first optical radiation 60 and the second digital image displayed by the display 4.

Advantageously, the prisms 11, 23, 70, 71 of the optical assembly 13 can be bonded together to form a one-piece optical assembly 13. According to yet another advantage, further elements 4, 7, 14, 90 can be fixedly mounted on the optical assembly 13. Moreover, when elements 4, 7, 14, 90 are fixedly mounted on a one-piece optical assembly 13, the one-piece optical assembly 13 and the fixed elements 4, 7, 14, 90 form a one-piece assembly 50. The term 'one-piece' is understood to mean an assembly of elements that are fixed to one another in such a way that the removal of one of the elements from the assembly leads to the mechanical destruction of the assembly.

Thus, a one-piece assembly 50 is provided, preventing movement of the elements of the assembly 50 relative to one another, which can occur, for example, in the event of impacts or vibrations. The one-piece assembly 50 is also said to act as an optical invariant. Advantageously, the first sensor 7, the display 4, and the optical attenuator 90 are fixedly mounted on the one-piece optical assembly 13. This makes a collimation of the first, second and third optical paths 2, 10, 5 robust to any displacements of the various elements of the optical paths relative to one another, in particular displacements relative to a lens 20 located at the entrance of the first optical path 2 or relative to an eyepiece 21 located at the exit of the third optical path 5. The fourth optical path 3 can be collimated by digital image processing with the first digital path 2 using conventional image processing techniques. Thus, after digital collimation of the first and second digital paths 2, 3, the one-piece assembly 50 allows the first and second digital paths 2, 3 to be collimated with the second and third optical paths 10, 5. The one-piece assembly 50 allows the second digital image, originating from the first and third digital images, to be superimposed with the image of the scene originating from the second optical path 10, i.e. the third optical radiation 91, without any offset between the fields. The superposition of images is also known as optical fusion. The one-piece assembly 50 provides for robust collimation by maintaining collimation in the event of any impacts and vibrations. In other words, the one-piece assembly 50 minimises the risk of decollimation.

Advantageously, the optical assembly 13 can include a crosshair reticle 14. More particularly, the second optical path 10 includes the crosshair reticle 14. For example, the reticle 14 is a FIGURE deposited on a surface of a glass by screen printing or photolithography. The reticle 14 can also be made of tensioned wires. A FIGURE can thus be superimposed on the image of the scene to be observed. The crosshair reticle 14 can be mounted on the optical assembly 13, preferably in a fixed manner, to thus form part of the one-piece assembly 50. This makes the collimation of the first, second and third optical paths 2, 10, 5 with the crosshair reticle 14 robust to any displacements of the various elements of these optical paths 2, 10, 5 relative to one another. Advantageously, the crosshair reticle 14 is fixedly mounted on the exit face 76 of the first optical system 23.

Advantageously, the observation system 1 includes a casing 19 in which the sensors 7, 8, the optical element 11, the display 4, the attenuator 90, the optical assembly 13, the reticle 14 and the battery are housed. Furthermore, the first optical path 2 can comprise the lens 20 mounted on the casing 19. The fourth optical path 3 can further comprise an additional lens 26 mounted on the casing 19. The eyepiece 21 allows the user 9 to observe the second image from the display 4 and the third optical radiation 90 transmitted by the attenuator 90. Advantageously, in the event of movement of the lens 20 relative to the one-piece assembly 50, the first, second and third optical paths 2, 10 and 5, the reticle 14 and the attenuator 90 remain collimated with one another. An observation method can be implemented by the observation system 1 defined hereinabove. The system and method described hereinabove are particularly suitable for portable monocular or binocular-type systems and for both day and night vision. The system improves the observation of a scene both during the day and at night. The observation system further reduces the size of the batteries and is particularly light. Moreover, it prevents offsets between the image fields in the event of impacts and vibrations, and makes it easier to observe scenes when the user is moving.

The invention claimed is:

1. An observation system comprising a first optical path that is capable of receiving a first optical radiation emitted by a scene to be observed and including a main sensor configured to generate a first digital image from the first optical radiation;

a second optical path that is capable of receiving a second optical radiation originating from the scene to be observed and including an optical attenuator having a variable opacity and capable of modifying a light intensity of the second optical radiation;

a display configured to display a second digital image from the first digital image; and a third optical path coupled to the display and to the optical attenuator and designed to observe the second digital image and third optical radiation transmitted by the optical attenuator;

wherein the observation system includes an electronic control unit including an image processing unit configured to determine a light intensity of at least one pixel of the first digital image generated by the main sensor and to compare the determined light intensity to at least one threshold, and the electronic control unit is configured to automatically output a command to increase the opacity of the optical attenuator when the determined light intensity is greater than or equal to said at least one threshold.

2. The system according to claim 1, wherein the optical attenuator includes at least one liquid crystal cell.

3. The system according to claim 1, wherein the optical attenuator includes at least one electrochromic cell.

4. The system according to claim 1, wherein the optical connector is configured to transmit the third optical radiation by transparency.

5. The system according to claim 1, wherein the optical attenuator is configured to transmit the third optical radiation by reflection.

6. The system according to claim 1, comprising a fourth optical path capable of receiving fourth optical radiation emitted by the scene and including an additional sensor configured to generate a third digital image from the fourth optical radiation; the image processing unit being configured to generate the second digital image from a fusion between the first and third digital images.

7. The system according to claim 1, wherein the first optical path comprises an optical element configured to transmit a first part of the first optical radiation to the first sensor and to transmit a second part of the first optical radiation corresponding to the second optical radiation to the optical attenuator.

8. The system according to claim 7, comprising an optical assembly including the optical element and the optical attenuator, the optical assembly being in one piece.

9. An observation method, comprising receiving a first optical radiation emitted by a scene to be observed from a first optical path provided with a main sensor generating a first digital image from the first optical radiation;

receiving a second optical radiation originating from the scene to be observed from a second optical path provided with an optical attenuator having a variable opacity and capable of modifying a light intensity of the second optical radiation;

displaying a second digital image from the first digital image; and observing, from a third optical path, third optical radiation transmitted by the optical attenuator, and the second digital image, wherein the observation method includes, by an electronic control unit including an image processing unit, determining a light intensity of at least one pixel of the first digital image generated by the main sensor and comparing the determined light intensity to a threshold and automatically outputting a command to increase the opacity of the optical attenuator when the determined light intensity is greater than or equal to the threshold.

10. The system according to claim 1, wherein the command output by the electronic control unit is according to a continuous function of the determined light intensity or a discrete function comprising at least three stages based on the determined light intensity.

11. The system according to claim 10, wherein the command output by the electronic control unit is in the form of a voltage.

* * * * *